Nov. 27, 1928. 1,693,499
G. H. TREGLOWN ET AL
DIRIGIBLE HEADLIGHT MECHANISM
Filed Oct. 16, 1926
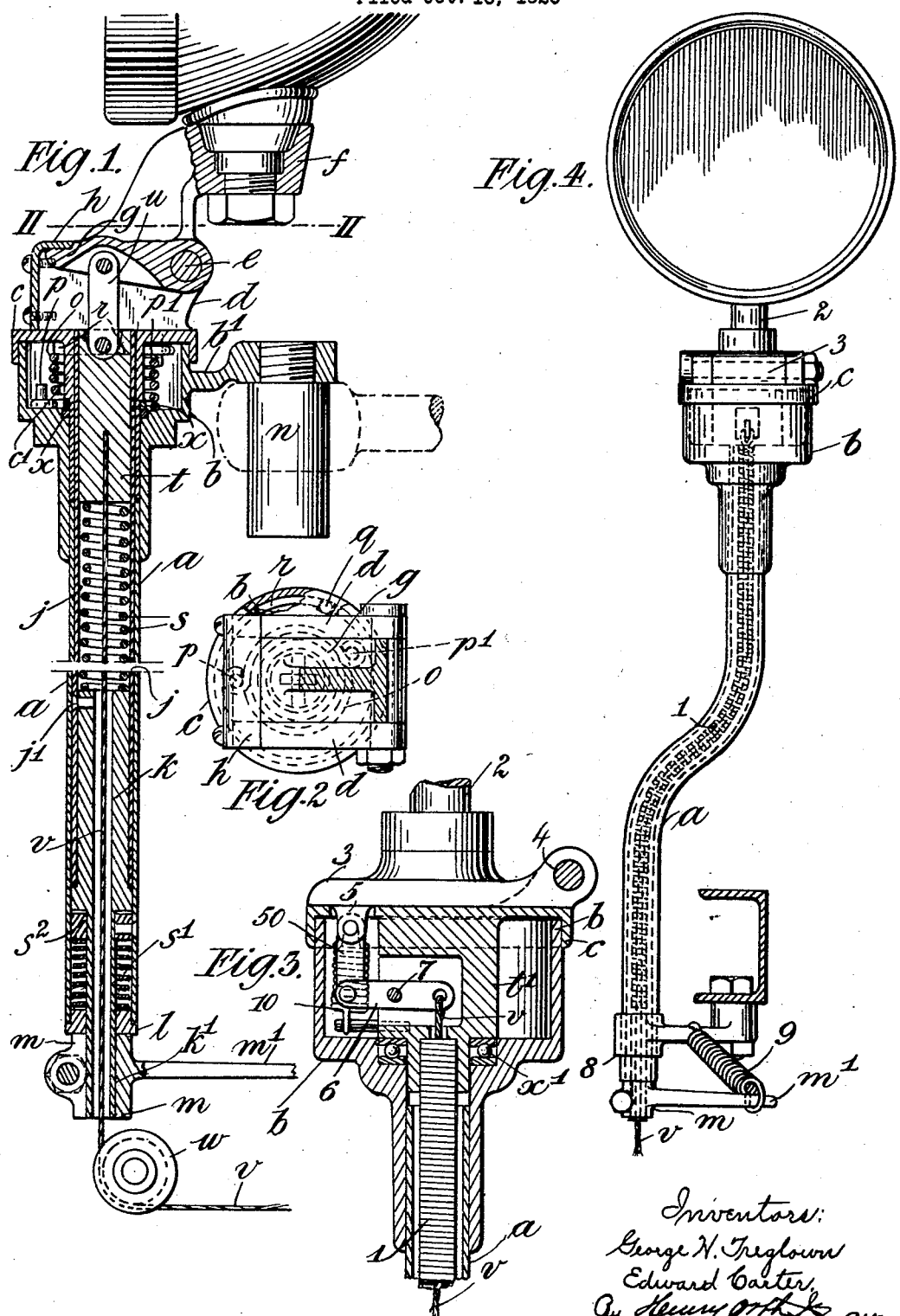

Patented Nov. 27, 1928.

1,693,499

UNITED STATES PATENT OFFICE.

GEORGE HENRY TREGLOWN AND EDWARD CARTER, OF LONDON, ENGLAND, ASSIGNORS TO THE CORRECTA LIGHT COMPANY, LIMITED, OF LONDON, ENGLAND, A COMPANY OF GREAT BRITAIN.

DIRIGIBLE HEADLIGHT MECHANISM.

Application filed October 16, 1926, Serial No. 142,032, and in Great Britain April 17, 1926.

This invention comprises improvements in swivel lamps for steerable vehicles, such swivel lamps and their operating mechanisms being advantageously applied so that when the vehicle is steered to the left, one of the lamps is turned leftwardly about its swivel, and when the vehicle is steered to the right the other lamp is turned rightwardly about its swivel.

The principal object of this invention is to provide improved means for enabling these swivelling lamps to be dipped for the purpose of lowering the beams or throwing them on to the ground out of the line of vision of approaching pedestrians, cyclists, motorists and other road users.

Another object is to provide a construction of combined swivelling and dipping mechanism adapted for being installed in situations wherein the use of a straight line vertical shaft is prevented by, for example, the lamp centres being disposed immediately above the dumb irons or longitudinal members of the vehicle frame.

Yet another object is to provide a combination mechanism of the character indicated adapted for being installed on existing motor vehicles with a minimum of trouble and without necessitating any structural alteration.

Finally, it is an object of this invention to adapt the mechanisms so that the dipping of the lamp may be accomplished with the same facility in any angular position to which the lamp may have been turned about its swivel by the steering action. In order to enable the invention to be readily understood reference is made to the accompanying drawing illustrating two examples of construction, in which drawing:—

Figure 1 is a vertical sectional elevation of a combined lamp swivelling and dipping mechanism adapted for being mounted in an ordinary lamp socket of the kind usually employed on motor vehicles.

Figure 2 is a plan section, the section being taken on the line II—II of Figure 1, and parts being broken away to display a stop device.

Figure 3 is a vertical sectional elevation of the upper portion of a modified construction.

Figure 4 is an elevation, to a smaller scale of the complete device embodying the modification of Figure 3.

Referring to the construction illustrated by Figures 1 and 2, $a$ is a vertically disposed tubular casing fitted at the upper end with an enlargement or cup $b$. A cap $c$ rotatable about the top of the cup $b$ carries supports $d$ for a horizontal pivot $e$ upon which is pivotally mounted an arm or platform $g$ carrying a lamp support comprising a socket $f$. The platform $g$ moves about the pivot $e$ with guidance between the pivot supports $d$, being prevented from moving upwardly above the position seen in Figure 1 by means of an angular stop plate $h$ secured by screws to the vertical edges of the supports $d$. The cap $c$ is formed centrally with a depending tubular part $c'$ within which is fixedly secured the upper end of a hollow shaft $j$ rotatable within the casing $a$. Within the lower end of the hollow shaft $j$ there is fixedly secured, as by a rivet $j'$, a tubular part $k$ the lower reduced end portion $k'$ of which extends down below the lower end of the casing $a$ and through a plain plug or cap $l$ on the lower end of the casing. On the protruding end of the tubular part $k'$ there is fixedly secured the hub $m$ of a lever arm $m'$ this lever arm being adapted for being engaged by a suitable member of the steering gear of the vehicle. As will be seen, the hollow shaft $j$ and tubular part $k$ are suspended by the cap $c$ suitably supported as for instance in the manner hereinafter described so as to be rotatable about the top edge of the cup $b$, and at the same time the cap $c$ is prevented from rising off the cup $b$ owing to the lower end $k'$ of the part $k$ being held by the hub $m$ bearing against the cap $l$ at the bottom. A spring $s'$ may be inserted between a collar $s^2$ riveted to the casing $a$ on the interior of the latter, and the plug or cap $l$. This spring operates to keep the cap $c$ resiliently down on the cup $b$ as it presses down on the plug or cap $l$ which bears upon the hub $m$ fixed to the tubular part $k'$.

On the cup $b$ there is formed an arm $b'$ which carries a depending stem $n$, and the device is mounted on the vehicle by inserting the stem $n$ into the usual lamp socket on the vehicle, the lamp having been removed from such socket and inserted into the socket $f$ of the fitting. With the fitting so mounted on the vehicle, the arm $m'$ can be disposed in the path of a part or projection on the steering gear so as to be turned against the action of a suitable spring when steering in one direction takes place. The turning of the arm $m'$ is imparted through the part $k'$ $k$ to the hollow shaft $j$, so that the latter causes the cap $c$ and the lamp supported thereon to turn in the same direction as the steering for the well-known purpose. A spring $o$ coiled around the part $c'$ of the cap $c$ may have one end anchored to a stud $p$ in the floor of the cup $b$ and the other end anchored to a stud $p'$ projecting downwardly from the cap $c$. When the cap $c$ is turned as aforesaid, the coil spring $o$ is contracted and tensioned and so effects the return of the cap $c$, shaft $j$ and arm $m'$ to the original position when the steering is returned to the line-ahead position. A stud $q$, Figure 2, depending from the cap $c$ may engage in a notch $r$ formed in the rim of the cup $b$, so that the end walls of this notch act as stops for the stud $q$, and the arc over which the notch extends determines the extent of possible turning of the cap $c$ and the lamp thereon.

Within the shaft $j$ there is a spring $s$ resting with its lower end against the tubular part $k$ and pressing with its upper end against a piston $t$ slidable up and down in the upper end of the shaft $j$. The upper end of the piston $t$ is connected by a link $u$ with the arm $g$ of the lamp mounting and the lower end of the piston is connected by a flexible connector or wire $v$ with a suitable control such as a lever on the dash board of the vehicle, the wire passing around idle guide pulleys such as $w$ in its passage to the control. The pressure due to the spring $s$ keeps the arm $g$ normally up against the stop plate $h$ in which position of the parts the lamp throws its beam in the horizontal or substantially horizontal direction as usual. To cause the beam to dip, the wire $v$ is pulled to lower the piston $t$ against the resistance of the spring $s$ and the piston $t$ through the link $u$ lowers the arm $g$ about its pivot $e$, thereby tilting the lamp and throwing the beam downwards on to the ground for the purpose hereinbefore explained. The spring $s$ need not be of the length shown, as both it and the shaft $j$ could be shortened and the tubular part $k$ could be lengthened, as will be apparent. Anti-frictional bearings, such as the hardened steel rings $x$, are advantageously inserted between a shoulder on the tubular part $c'$ of the cap $c$ and the floor of the cup $b$, this bearing being effective for supporting the cap $c$ and the parts connected therewith revolubly about the vertical axis. It will be noticed that, should there be a dumb iron or other vehicle part immediately beneath the original lamp centre, which is coincident with the central vertical axis of the stem $n$ when inserted in the lamp socket, the arm $b'$ offsets the casing $a$ so that the lower end thereof hangs clear of such construction and there is freedom to make operative engagement between the arm $m'$ and a member of the steering gear.

According to the modification illustrated in Figure 3, the upper part of the casing $a$ is supported in a lamp bracket the lower part being offset by bending the casing $a$ as illustrated in Figure 4. In this construction, a flexible shaft 1 is connected between the hub $m$ of the operating arm $m'$ and a cylindrical part $t'$ depending from the cap $c$. A shoulder formed by reducing the lower end of the cylindrical part $t'$ runs on a ball bearing $x'$ which takes the place of the hardened steel rings $x$ of Figure 1. The lamp is suitably supported by a stem 2 erected on a disc 3 hinged at 4 to the cap $c$. A lug 5 on the underside of the disc 3 projects through a slot in the cap $c$ and is pivotally connected by a link 50 with one arm of a two-armed lever 6 which can oscillate about a pivot 7 in the cylindrical part $t'$, the last-named part being hollowed out, as shown, to accommodate the pivot 7 and lever 6. The other arm of the lever 6 is connected by flexible means such as the wire $v$ with a control on the vehicle. The lower end of the casing $a$ is stayed against the vehicle frame by a bracket eye 8, and a spring 9 is connected between the bracket eye 8 and the arm $m'$. Means are employed tending to constantly hold the disc 3 down upon the cap $c$ such for instance as by a spring 10 connected between lug 5 on the disc 3 and the lower part of the cylindrical part $t'$ of the cap $c$.

The operation of the modified construction is as follows:—When the vehicle is steered in one direction, the steering gear engages the arm $m'$ and turns the latter against the action of the spring 9, the flexible shaft 1 transmitting this turning movement to the cylindrical part $t'$, so that the cap $c$, disc 3 and lamp support 2 partake of this movement, and the lamp follows the steering. Upon restoring the steering gear to line-ahead, the spring 9 returns the parts aforesaid and the lamp also to line-ahead. At any moment, and whether the lamp has been swivelled or not, it is possible to dip the beam by pulling on the flexible connector $v$ and thereby lowering the inner arm of the lever 6, the corresponding elevation of the other arm of this lever being transmitted by the link 50 to the disc 3 and causing the latter to tilt about its hinge 4 against the action of the spring 10, thereby tilting the lamp and lowering the beam. Naturally, cushioning devices may be adopted for avoiding shock to the parts when the disc 3 is subsequently lowered by the pull of the spring 10, upon relaxing the pull on the flexible connector $v$.

It will now be seen that these improvements provide a simple, self-contained and fool-proof mechanism, having its operative parts enclosed and protected, and adapted for

We claim:—

1. A swivel lamp for steerable vehicles, comprising a tubular casing, means for supporting said casing on the vehicle, a hollow shaft revoluble within said casing, a carrier revoluble upon the upper end of said casing and fixedly connected to the upper end of said shaft, a crank arm secured to the lower end of said hollow shaft the free end of which crank arm is adapted for engaging the steering mechanism of the vehicle in one direction of movement thereof to turn said hollow shaft, resilient means adapted to return said shaft after operation, a platform pivotally mounted on a substantially horizontal pivot on said carrier, means for removably supporting a lamp on said platform, a spring constantly operative upon said platform, and a flexible member extending centrally through said hollow shaft and operative through suitable control means for moving said platform about its pivot against the action of said spring.

2. A swivel lamp mounting for a steerable vehicle comprising a swivel mounting, a platform hingedly mounted thereon, means for removably supporting a lamp on said platform, a depending hollow shaft connected with said mounting and adapted for engaging the steering gear in one direction of movement thereof to effect swivelling of said lamp, a spring constantly tending to maintain said platform in a position corresponding with a normal elevation of the lamp beam, and a flexible connector extending centrally through said hollow shaft and swivel mounting, said connector being operable for moving said platform about its hinge against the action of said spring to cause the lamp beam to dip.

3. A combined lamp swivelling and dipping mechanism for steerable vehicles comprising a swivel cap on a tubular casing, a hollow flexible shaft depending from said cap and extending through said casing, a platform hingedly mounted on said swivel cap, means for removably supporting a lamp on said platform, resilient means normally holding said platform against a stop, and a flexible connector extending through said hollow shaft and operable for moving said platform about its hinge away from the stop.

4. A combined lamp swivelling and dipping mechanism for steerable vehicles comprising a swivel device, a platform hinged thereon, means for removably supporting a lamp on said platform, a spring device constantly tending to hold said swivel in a position corresponding with a line-ahead position of the lamp, a second spring device constantly tending to hold said platform in a position corresponding with normal beam-elevation, a flexible hollow shaft fixedly connected with said swivel, a flexible connector disposed centrally within said shaft and operatively connected with said platform, a crank arm on said shaft for engaging a steering gear part in one direction of movement of the latter, and manual control means connected with said connector and operative for hingedly moving said platform against its spring to dip the lamp beam.

5. A combined lamp swivelling and dipping mechanism for steerable vehicles comprising a tubular casing mountable vertically on a vehicle, a cup on the upper end of said casing, a cap revoluble on said cup, a platform hingedly mounted on said cap, means for removably supporting a lamp on said platform, a spring resisting turning of said cap in one direction, a flexible hollow shaft depending from said cap and extending through said casing, a crank arm on the lower end of said shaft, a flexible connector extending centrally through said shaft and operatively connected with the hingedly mounted platform, and a spring resisting movement of said platform about its hinge in the direction in which it moves when said flexible connector is tensioned.

6. A head lamp adjusting mechanism for steerable vehicles adapted for dipping control and comprising a flexible tubular shaft, means to rotate the latter, a rotary carrier operatively connected with the shaft at its upper end, a casing enclosing said shaft, a spring operated platform hingedly mounted on said carrier, means for removably supporting a lamp on said platform, and flexible connector extending centrally through said flexible tubular shaft and operative upon the hinged platform to control the dipping of the lamp.

GEORGE HENRY TREGLOWN. [L. S.]
EDWARD CARTER. [L. S.]